(12) United States Patent
Galati

(10) Patent No.: US 10,384,385 B2
(45) Date of Patent: *Aug. 20, 2019

(54) REDUCED VELOCITY CONTROL BASED ON SENSED SYSTEM CONDITION

(71) Applicant: Synventive Molding Solutions, Inc., Peabody, MA (US)

(72) Inventor: Vito Galati, Rowley, MA (US)

(73) Assignee: Synventive Molding Solutions, Inc., Peabody, MA (US)

( * ) Notice: Subject to any disclaimer, the term of this patent is extended or adjusted under 35 U.S.C. 154(b) by 686 days.

This patent is subject to a terminal disclaimer.

(21) Appl. No.: 15/134,432

(22) Filed: Apr. 21, 2016

(65) Prior Publication Data

US 2016/0229102 A1 Aug. 11, 2016

Related U.S. Application Data (63) Continuation of application No. PCT/US2014/062620, filed on Oct. 28, 2014.

(Continued)

(51) Int. Cl.
*B29C 45/28* (2006.01)
*B29C 45/77* (2006.01)

(Continued)

(52) U.S. Cl.
CPC .......... *B29C 45/77* (2013.01); *B29C 45/0025* (2013.01); *B29C 45/2806* (2013.01);

(Continued)

(58) Field of Classification Search
CPC ... B29C 45/2806; B29C 45/281; B29C 45/76; B29C 45/77; B29C 2945/76381;

(Continued)

(56) References Cited

U.S. PATENT DOCUMENTS 9,724,861 B2 * 8/2017 Antunes .............. B29C 45/2703

FOREIGN PATENT DOCUMENTS

| WO | 2001/60580 A1 | 8/2001 |
| WO | 2012074879 A1 | 6/2012 |

OTHER PUBLICATIONS

Int'l. Preliminary Report on Patentability dated Jan. 25, 2016 in corresponding Int'l. Appln. No. PCT/US2014/062620.

(Continued)

*Primary Examiner* — Philip C Tucker
*Assistant Examiner* — Brian R Slawski
(74) *Attorney, Agent, or Firm* — Polsinelli PC (57) ABSTRACT

An injection molding system comprised of:
- an injection machine having a barrel and a screw for injecting an injection fluid,
- a distribution manifold,
- a valve associated with a corresponding one of one or more downstream gates,
- a sensor adapted to sense and generate a signal indicative of pressure of the injection fluid in the barrel or an inlet that delivers injection fluid from the barrel to the manifold, and
- a controller receiving the signal generated from the sensor and including instructions that use the signal as a control value to adjust, during the course of an injection cycle, positioning or velocity of one or more of the valve pins.

18 Claims, 3 Drawing Sheets

Related U.S. Application Data (60) Provisional application No. 61/896,313, filed on Oct. 28, 2013.

(51) Int. Cl.
*B29C 45/76* (2006.01)
*B29C 45/00* (2006.01)

(52) U.S. Cl.
CPC ...... *B29C 45/76* (2013.01); *B29C 2045/0032* (2013.01); *B29C 2945/76006* (2013.01); *B29C 2945/7611* (2013.01); *B29C 2945/7619* (2013.01); *B29C 2945/7621* (2013.01); *B29C 2945/76083* (2013.01); *B29C 2945/76187* (2013.01); *B29C 2945/76214* (2013.01); *B29C 2945/76257* (2013.01); *B29C 2945/76545* (2013.01); *B29C 2945/76598* (2013.01); *B29C 2945/76755* (2013.01); *B29C 2945/76859* (2013.01); *B29C 2945/76936* (2013.01)

(58) Field of Classification Search
CPC .......... B29C 2945/76595; B29C 2945/76598; B29C 2945/76755; B29C 2045/2817; B29C 2045/2872; B29C 2045/2687

USPC ... 264/40.1, 40.5, 40.7, 328.1, 328.8, 328.9, 264/328.12, 328.13, 297.2; 425/135, 145, 425/146, 149, 150, 542, 562, 564, 567, 425/568, 569

See application file for complete search history.

(56) References Cited

OTHER PUBLICATIONS

Int'l. Search Report and Written Opinion dated Jan. 22, 2015 in corresponding Int'l. Appln. No. PCT/US2014/062620.

Kazmer, D. et al., "Multi-Cavity Pressure Control in the Filling and Packing Stages of the Injection Molding Process," Polymer Engineering and Science, Brookfield Center, US, vol. 37, No. 11, Nov. 1, 1997, pp. 1865-1879, XP00076243, ISSN: 0032-3888.

Michaeli, W. et al., "Kaskadenspritzgiessen Analysiert and Mit Cadmould Berechnet. Cascade Injection Moulding Analysed and Calculated using Cadmould," Plastverarbeiter, Huethig GMBH, Heidelberg, DE, vol. 45, No. 11, Nov. 1, 1994, XP000482361, ISSN: 0032-1338.

European Examination Article 94(3) in corresponding European Application No. 14795929.0 dated Sep. 4, 2018.

\* cited by examiner

REDUCED VELOCITY CONTROL BASED ON SENSED SYSTEM CONDITION

RELATED APPLICATIONS

This application is a continuation of and claims the benefit of priority to PCT/US2014/062620 filed Oct. 28, 2014 which in turn claims the benefit of priority to U.S. Provisional Application No. 61/896,313 filed Oct. 28, 2013 the disclosures of both which are incorporated herein by reference in their entirety as if fully set forth herein.

This application also claims the benefit of priority to and is a continuation-in-part of U.S. application Ser. No. 13/484,336 filed May 31, 2012 and U.S. application Ser. No. 13/484,408 filed May 31, 2012, the disclosures of all of which are incorporated herein by reference in their entirety as if fully set forth herein.

This application also claims the benefit of priority to and is a continuation-in-part of international application PCT/US13/75064 filed Dec. 13, 2013 and international application PCT/US14/192210 filed Feb. 28, 2014 and international application PCT/US14/31000 filed Mar. 18, 2014, the disclosures of all of which are incorporated herein by reference in their entirety as if fully set forth herein.

The disclosures of all of the following are incorporated by reference in their entirety as if fully set forth herein: U.S. Pat. Nos. 5,894,025, 6,062,840, 6,294,122, 6,309,208, 6,287,107, 6,343,921, 6,343,922, 6,254,377, 6,261,075, 6,361,300 (7006), U.S. Pat. Nos. 6,419,870, 6,464,909 (7031), U.S. Pat. Nos. 6,599,116, 7,234,929 (7075US1), U.S. Pat. No. 7,419,625 (7075US2), U.S. Pat. No. 7,569,169 (7075US3), U.S. patent application Ser. No. 10/214,118, filed Aug. 8, 2002 (7006), U.S. Pat. No. 7,029,268 (7077US1), U.S. Pat. No. 7,270,537 (7077US2), U.S. Pat. No. 7,597,828 (7077US3), U.S. patent application Ser. No. 09/699,856 filed Oct. 30, 2000 (7056), U.S. patent application Ser. No. 10/269,927 filed Oct. 11, 2002 (7031), U.S. application Ser. No. 09/503,832 filed Feb. 15, 2000 (7053), U.S. application Ser. No. 09/656,846 filed Sep. 7, 2000 (7060), U.S. application Ser. No. 10/006,504 filed Dec. 3, 2001, (7068) and U.S. application Ser. No. 10/101,278 filed Mar. 19, 2002 (7070)

BACKGROUND OF THE INVENTION

Injection molding systems using multiple sensors for sensing the position of multiple valve pins or actuators or the pressure of injection material within multiple nozzles or at multiple gates to follow a non-adaptive profile of pressure or non-adaptive profile of pin position over the course of sequential injection molding cycles have been developed. The present invention overcomes limitations in such systems as described for example in WO2012074879(A1) and U.S. Pat. No. 6,464,909.

SUMMARY OF THE INVENTION

In accordance with the invention there is provided an injection molding system comprised of:
an injection machine having a barrel and a screw for injecting an injection fluid to one or more downstream gates of one or more cavities of one or more molds during a first injection cycle and during a second injection cycle following the first injection cycle,
a distribution manifold for receiving the molten injection fluid from the barrel and distributing the injection fluid through one or more fluid delivery channels in the manifold that deliver the injection fluid to the one or more downstream fluid passages that mate with corresponding ones of the one or downstream gates to the one or more mold cavities,
a valve associated with each downstream gate, each valve comprising an actuator interconnected to and reciprocally driving a corresponding valve pin at one or more selectable upstream travel velocities that include a maximum upstream travel velocity, the valve pins being driven between a gate closed position and a selected maximum upstream gate open position defining a complete upstream path of travel for each injection cycle,
a sensor adapted to sense pressure of the injection fluid in the barrel or in an inlet that delivers injection fluid from the barrel to the manifold,
a controller to which the sensor sends a signal indicative of the sensed pressure,
the controller receiving the signal and including instructions that use the signal as a control value that controls each valve pin to be driven, during the second injection cycle, through an initial upstream path of travel beginning from the closed position through at least a portion of the complete upstream path of travel at one or more initial reduced upstream travel velocities during the second injection cycle that are less than the maximum upstream travel velocity,
the instructions further using the control value as a variable in an algorithm that establishes an instruction value for the one or more initial reduced upstream velocities that operates to drive the one or more valve pins to effect a rate of flow of injection fluid through each gate corresponding to the one or more valve pins during the second injection cycle that is either reduced or is substantially constant relative to the rate of flow of injection fluid during the first injection cycle over at least the initial upstream path of travel of the one or more valve pins.

The controller preferably uses the signal sent by the sensor as a control value that controls each actuator to drive a corresponding valve pin, during a third injection or other subsequent cycle following the second injection cycle, through an initial upstream path of travel beginning from the closed position through at least a portion of the complete upstream path of travel at one or more initial reduced upstream travel velocities during the third or other subsequent injection cycle that are less than the maximum upstream travel velocity, the instructions further using the control value as a variable in an algorithm that establishes an instruction value for the one or more initial reduced upstream velocities that operates to drive the one or more valve pins to effect a rate of flow of injection fluid through each gate corresponding to the one or more valve pins during the third or other subsequent injection cycle that is either reduced or is substantially constant relative to the rate of flow of injection fluid during the second injection cycle over at least the initial upstream path of travel of the one or more valve pins.

The sensor is typically adapted to sense one or more conditions selected from the group of:
pressure of the injection fluid in the barrel or in the inlet,
speed or position of the screw,
pressure of the injection fluid in the one or more fluid delivery channels in the manifold,
pressure in a cavity of one or more of the molds,
wherein the sensor sends a signal indicative of the one or more sensed conditions to the controller, and,
the controller receives and uses the signal as the control value.

The instructions can instruct the actuator to drive the pin continuously upstream throughout the complete upstream path of travel.

The controller can receive and the instruction can use the control value in real time in a closed loop over the course of travel of the one or more valve pins over at least a portion of the complete path of upstream travel, the instructions directing the one or more valve pins to either follow a predetermined profile of pressure or pin position or velocity or to calculate a pin position or velocity and drive the pin at or to the calculated position or velocity in real time based on the control value.

In another aspect of the invention there is provided a method of injecting an injection fluid into one or more cavities of one or more molds, comprising:

operating an injection molding system as described immediately above to inject the injection fluid into the one or more cavities, and forming a part from the injection fluid injected into the one or more cavities.

In another aspect of the invention there is provided an injection molding system comprised of:

an injection machine having a barrel and a screw for injecting an injection fluid, a distribution manifold for receiving the injection fluid from the barrel and distributing the injection fluid through one or more fluid delivery channels in the manifold that deliver the injection fluid to one or more downstream fluid passages that mate with corresponding one or more downstream gates to corresponding one or more mold cavities, a valve associated with a corresponding one of one or more downstream gates, each valve comprising an actuator interconnected to and reciprocally driving a corresponding valve pin at one or more selectable upstream velocities including a maximum upstream velocity, the valve pin being driven between a gate closed position and a selected maximum upstream gate open position defining a complete upstream path of travel, a sensor adapted to sense and generate a signal indicative of pressure of the injection fluid in the barrel or an inlet that delivers injection fluid from the barrel to the manifold, the controller receiving the signal generated from the sensor and including instructions that use the signal as a control value to adjust, during the course of an injection cycle, positioning or velocity of one or more of the valve pins such that the rate of flow of injection fluid into a corresponding one or more of the cavities is controlled, during the course of the injection cycle, based on the control value.

The instructions typically use the signal as a control value to drive one or more of the valve pins through an initial upstream path of travel beginning from the closed position through at least a portion of the complete upstream path of travel at one or more initial reduced upstream travel velocities that are less than the maximum upstream travel velocity.

Preferably the system is operable to carry out a first injection cycle and a second injection cycle following the first injection cycle, the instructions using the signal as a control value that controls one or more valve pins to be driven, during the second injection cycle, through an initial upstream path of travel beginning from the closed position through at least a portion of the complete upstream path of travel at one or more initial reduced upstream travel velocities during the second injection cycle that are less than the maximum upstream travel velocity, the instructions further using the control value as a variable in an algorithm that establishes an instruction value for the one or more initial reduced upstream velocities that operates to drive the one or more valve pins to effect a rate of flow of injection fluid through each gate corresponding to the one or more valve pins during the second injection cycle that is either reduced or is substantially constant relative to the rate of flow of injection fluid during the first injection cycle over at least the initial upstream path of travel of the one or more valve pins.

The instructions can instruct the actuator to drive the pin continuously upstream throughout the complete upstream path of travel.

The controller can receive and the instructions can use the control value in real time in a closed loop over the course of travel of the one or more valve pins over at least a portion of the complete path of upstream travel, the instructions directing the one or more valve pins to either follow a predetermined profile of pressure or pin position or velocity or to calculate a pin position or velocity and drive the pin at or to the calculated position or velocity in real time based on the control value.

In another aspect of the invention there is provided a method of injecting an injection fluid into one or more cavities of one or more molds, comprising: operating an injection molding system as described immediately above to inject the injection fluid into the one or more cavities, and forming a part from the injection fluid injected into the one or more cavities.

In another aspect of the invention there is provided an injection molding system comprised of:

an injection machine having a barrel and a screw for injecting an injection fluid, a distribution manifold for receiving the molten injection fluid from the barrel and distributing the injection fluid through one or more fluid delivery channels in the manifold that deliver the injection fluid to one or more downstream fluid passages that mate with corresponding downstream gates to one or more mold cavities, a valve associated with each downstream gate, each valve comprising an actuator interconnected to and reciprocally driving a corresponding valve pin at one or more selectable upstream velocities including a maximum upstream velocity, the pin being driven between a gate closed position and a selected maximum upstream gate open position defining a complete upstream path of travel, a controller that receives a signal from a sensor adapted to sense and generate a signal indicative of a condition selected from the group of:

pressure of the injection fluid in the barrel or an inlet that delivers injection fluid from the barrel to the manifold, speed or position of the screw, pressure of the injection fluid in the one or more fluid delivery channels in the manifold, the controller including instructions that use only the signal indicative of the selected condition as a control value that controls one or more valve pins to be driven through an initial upstream path of travel during an injection cycle beginning from the closed position through at least a portion of the complete upstream path of travel at one or more initial reduced upstream travel velocities during that are less than the maximum upstream travel velocity, the instructions further using the control value as a variable in an algorithm that establishes an instruction value for the one or more initial reduced upstream velocities that operates to drive the one or more valve pins to effect a rate of flow of injection fluid through each gate corresponding to the one or more valve pins during the injection cycle that is reduced relative to a maximum rate of flow of injection fluid an injection cycle over at least the initial upstream path of travel of the one or more valve pins.

The instructions in such an apparatus can instruct the actuator to drive the valve pin at one or more reduced velocities that are less than the maximum upstream velocity that maintain pressure of the injection material travelling through the gate at a substantially constant pressure throughout the course of the complete upstream path of travel.

Such a system is typically operable to carry out a first injection cycle and a second injection cycle following the first injection cycle, the instructions using the signal as a control value that controls one or more valve pins to be driven, during the second injection cycle, through an initial upstream path of travel beginning from the closed position through at least a portion of the complete upstream path of travel at one or more initial reduced upstream travel velocities during the second injection cycle that are less than the maximum upstream travel velocity, the instructions using the control value as a variable in an algorithm that establishes an instruction value for the one or more initial reduced upstream velocities that operates to drive the one or more valve pins to effect a rate of flow of injection fluid through each gate corresponding to the one or more valve pins during the second injection cycle that is either reduced or is substantially constant relative to the rate of flow of injection fluid during the first injection cycle over at least the initial upstream path of travel of the one or more valve pins.

The instructions can instruct the actuator to drive the pin continuously upstream throughout the complete upstream path of travel.

The controller can receive and the instructions can use the control value in real time in a closed loop over the course of travel of the one or more valve pins over at least a portion of the complete path of upstream travel, the instructions directing the one or more valve pins to either follow a predetermined profile of pressure or pin position or velocity or to calculate a pin position or velocity and drive the pin at or to the calculated position or velocity in real time based on the control value.

In another aspect of the invention there is provided a method of injecting an injection fluid into one or more cavities of one or more molds, comprising:

operating an injection molding system as described immediately above to inject the injection fluid into the one or more cavities, and forming a part from the injection fluid injected into the one or more cavities.

In another aspect of the invention there is provided an injection molding system comprised of:

an injection machine having a barrel and a screw for generating and injecting molten injection material, a distribution manifold for receiving the molten injection material from the injection machine and distributing the molten injection material through fluid delivery channels in the manifold to at least one fluid passages having a downstream gate, a mold having a cavity communicating with the gate for receiving the injection fluid material from the manifold through the fluid passage, a valve comprising an actuator interconnected to and reciprocally driving a pin at one or more selectable upstream velocities including a maximum upstream velocity, the pin being driven between a gate closed position and a selected maximum upstream gate open position defining a complete upstream path of travel, a sensor mounted to the barrel and arranged such that the sensor senses the molten injection material disposed in the barrel upstream of the manifold, the sensor sensing pressure and sending a signal representative of the pressure of the injection material in the barrel to a controller, the controller receiving the signal, and having algorithm that includes instructions that use the signal to instruct the actuator to drive the valve pin through an initial upstream path of travel beginning from the closed position through at least a portion of the complete upstream path of travel at an initial reduced upstream velocity that is less than the maximum upstream velocity and that maintains pressure of the injection material travelling through the gate at a substantially steady or constant pressure during at least the course of travel of the pin through the initial upstream path of travel.

The instructions typically instruct the actuator to drive the valve pin at one or more reduced velocities that are less than the maximum upstream velocity that maintain pressure of the injection material travelling through the gate at a substantially constant pressure throughout the course of the complete upstream path of travel.

The instructions preferably instruct the actuator to drive the pin continuously upstream throughout the complete upstream path of travel.

In another aspect of the invention there is provided an injection molding system comprised of:

an injection machine having a barrel and a screw for generating and injecting molten injection material, a distribution manifold for receiving the molten injection material from the injection machine and distributing the molten injection material through fluid delivery channels in the manifold to at least one fluid passages having a downstream gate, a mold having a cavity communicating with the gate for receiving the injection fluid material from the manifold through the fluid passage, a valve comprising an actuator interconnected to and reciprocally driving a pin at one or more selectable upstream velocities including a maximum upstream velocity, the pin being driven between a gate closed position and a selected maximum upstream gate open position defining a complete upstream path of travel, a sensor mounted and arranged such that the sensor senses the molten injection material disposed in a fluid flow channel downstream of the barrel, the sensor sensing pressure and sending a signal representative of the pressure of the injection material in the fluid flow channel, the controller receiving the signal, and having algorithm that includes instructions that use the signal to instruct the actuator to drive the valve pin through an initial upstream path of travel beginning from the closed position through at least a portion of the complete upstream path of travel at an initial reduced upstream velocity that is less than the maximum upstream velocity and that maintains pressure of the injection material travelling through the gate at a substantially steady or constant pressure during at least the course of travel of the pin through the initial upstream path of travel.

The instructions preferably instruct the actuator to drive the valve pin at one or more reduced velocities that are less than the maximum upstream velocity that maintain pressure of the injection material travelling through the gate at a substantially constant pressure throughout the course of the complete upstream path of travel.

The instructions typically instruct the actuator to drive the pin continuously upstream throughout the complete upstream path of travel.

In another aspect of the invention there is provided an injection molding system comprised of:

an injection machine having a barrel and a screw for generating and injecting molten injection material, a distribution manifold for receiving the molten injection material from the injection machine and distributing the molten injection material through fluid delivery channels in the manifold to at least one fluid passages having a downstream gate, a mold having a cavity communicating with the gate for receiving the injection fluid material from the manifold through the fluid passage, a valve comprising an actuator interconnected to and reciprocally driving a pin at one or more selectable upstream velocities including a maximum upstream velocity, the pin being driven between a gate closed position and a selected maximum upstream gate open position defining a complete upstream path of travel, a sensor mounted and arranged such that the sensor senses the molten injection material disposed in a fluid flow passage or the mold cavity, the sensor sending a signal representative of the pressure of the injection material in the fluid flow passage or the mold cavity, the controller receiving the signal, and having algorithm that includes instructions that use the signal to instruct the actuator to drive the valve pin through an initial upstream path of travel beginning from the closed position through at least a portion of the complete upstream path of travel at an initial reduced upstream velocity that is less than the maximum upstream velocity and that maintains pressure of the injection material travelling through the gate at a substantially steady or constant pressure during at least the course of travel of the pin through the initial upstream path of travel.

The instructions typically instruct the actuator to drive the valve pin at one or more reduced velocities that are less than the maximum upstream velocity that maintain pressure of the injection material travelling through the gate at a substantially constant pressure throughout the course of the complete upstream path of travel.

The instructions preferably instruct the actuator to drive the pin continuously upstream throughout the complete upstream path of travel.

In another aspect of the invention there is provided an injection molding system comprised of:

an injection machine having a barrel and a screw for generating and injecting molten injection material, a distribution manifold for receiving the molten injection material from the injection machine and distributing the molten injection material through fluid delivery channels in the manifold to at least one fluid passages having a downstream gate, a mold having a cavity communicating with the gate for receiving the injection fluid material from the manifold through the fluid passage, a valve comprising an actuator interconnected to and reciprocally driving a pin at one or more selectable upstream velocities including a maximum upstream velocity, the pin being driven between a gate closed position and a selected maximum upstream gate open position defining a complete upstream path of travel, a sensor mounted to the barrel and arranged such that the sensor senses the molten injection material disposed in the barrel upstream of the manifold, the sensor sending a signal representative of the pressure of the injection material in the barrel to a controller, the controller receiving the signal, and having an algorithm that includes instructions that use the signal to instruct the screw to drive the injection material at an increased pressure or rate that maintains pressure of the injection material travelling through the gate at a substantially steady or constant pressure during at least the course of travel of the pin through the initial upstream path of travel.

In another aspect of the invention there is provided an injection molding system comprised of:

an injection machine having a barrel and a screw for generating and injecting molten injection material, a distribution manifold for receiving the molten injection material from the injection machine and distributing the molten injection material through fluid delivery channels in the manifold to at least one fluid passages having a downstream gate, a mold having a cavity communicating with the gate for receiving the injection fluid material from the manifold through the fluid passage, a valve comprising an actuator interconnected to and reciprocally driving a pin at one or more selectable upstream velocities including a maximum upstream velocity, the pin being driven between a gate closed position and a selected maximum upstream gate open position defining a complete upstream path of travel, a sensor mounted to the barrel and arranged such that the sensor senses the molten injection material disposed in the system, the sensor sending a signal representative of the pressure of the injection material to a controller, the controller receiving the signal, and having an algorithm that includes instructions that use the signal to instruct the screw to drive the injection material at an increased pressure or rate that maintains pressure of the injection material travelling through the gate at a substantially steady or constant pressure during at least the course of travel of the pin through the initial upstream path of travel.

In another aspect of the invention there is provided a method of controlling injection of molten injection material in an injection molding system comprised of: an injection machine having a barrel and a screw for generating and injecting molten injection material, a distribution manifold for receiving the molten injection material from the injection machine and distributing the molten injection material through fluid delivery channels in the manifold to at least one fluid passages having a downstream gate, a mold having a cavity communicating with the gate for receiving the injection fluid material from the manifold through the fluid passage and a valve comprising an actuator interconnected to and reciprocally driving a pin at one or more selectable upstream velocities including a maximum upstream velocity, the pin being driven between a gate closed position and a selected maximum upstream gate open position defining a complete upstream path of travel, the method comprising:

mounting and arranging a sensor such that the sensor senses the molten injection material disposed in the barrel upstream of the manifold, the sensor sensing pressure and generating a signal representative of the pressure of the injection material in the barrel, instructing the actuator according to an algorithm that uses the signal to drive the valve pin through an initial upstream path of travel beginning from the closed position through at least a portion of the complete upstream path of travel at an initial reduced upstream velocity that is less than the maximum upstream velocity and that maintains pressure of the injection material travelling through the gate at a substantially steady or constant pressure during at least the course of travel of the pin through the initial upstream path of travel.

Such a method can further comprise driving the pin continuously upstream throughout entire course of the complete upstream path of travel.

In another aspect of the invention there is provided a method of controlling injection of molten injection material in an injection molding system comprised of: an injection machine having a barrel and a screw for generating and injecting molten injection material, a distribution manifold for receiving the molten injection material from the injection machine and distributing the molten injection material through fluid delivery channels in the manifold to at least one fluid passages having a downstream gate, a mold having a cavity communicating with the gate for receiving the injection fluid material from the manifold through the fluid passage and a valve comprising an actuator interconnected to and reciprocally driving a pin at one or more selectable upstream velocities including a maximum upstream velocity, the pin being driven between a gate closed position and a selected maximum upstream gate open position defining a complete upstream path of travel, the method comprising:

mounting and arranging a sensor such that the sensor senses the molten injection material disposed in system, the sensor sensing pressure and generating a signal representative of the pressure of the injection material, instructing the actuator according to an algorithm that uses the signal to drive the valve pin through an initial upstream path of travel beginning from the closed position through at least a portion of the complete upstream path of travel at an initial reduced upstream velocity that is less than the maximum upstream velocity and that maintains pressure of the injection material travelling through the gate at a substantially steady or constant pressure during at least the course of travel of the pin through the initial upstream path of travel.

Such a method can further comprise driving the pin continuously upstream throughout entire course of the complete upstream path of travel.

BRIEF DESCRIPTION OF THE DRAWINGS

The above and further advantages of the invention may be better understood by referring to the following description in conjunction with the accompanying drawings in which.

DETAILED DESCRIPTION

Figure 1:
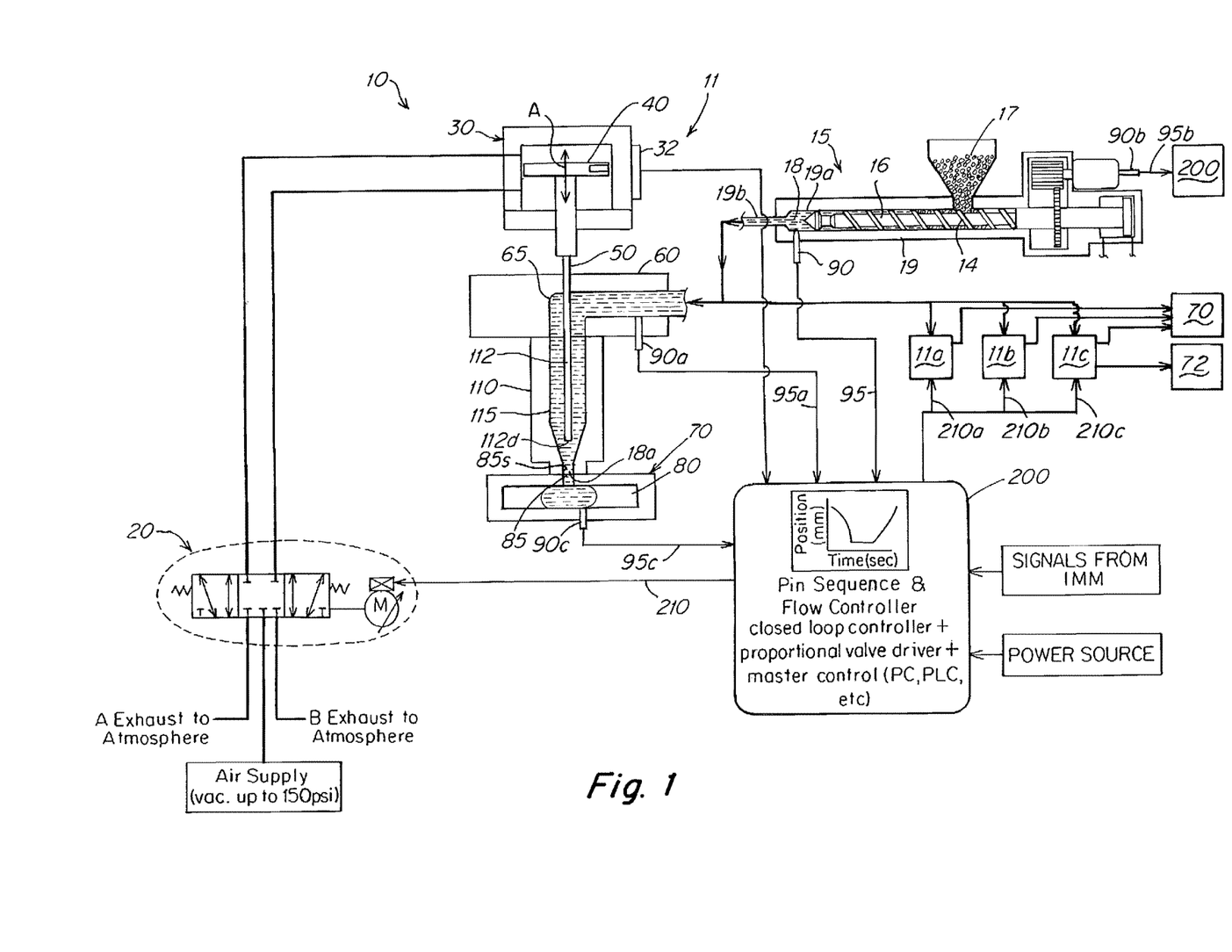
FIG. 1 is a schematic of an embodiment of the invention showing the arrangement of a system comprised of an injection machine having an injection material pressure sensor mounted for sensing the pressure of molten injection material within the interior of the barrel or the inlet between the barrel and the manifold with the pressure signal from the sensor being input to an electronic controller that controls the drive of one or more actuators that drives a respective valve pin mounted for reciprocal movement through a fluid delivery passage communicating with a respective gate to one or more mold cavities.

FIG. 1 shows one system embodiment 10 of the invention comprised of an injection machine 15 that feeds meltable injection material that is converted from solid form 17 into molten or liquid flowing material form 18 within the barrel 19 of the machine 15 by a screw 16. The screw 16 is controllably rotated at a selected rate such that the helical threads 14 of the screw 16 drive the molten material 16 downstream under a controlled pressure into a fluid distribution channel 65 of a hotrunner or manifold 60. The fluid distribution channel 65 can commonly feed into the downstream flow passage(s) 115 of the injection nozzle(s) 110 of one or more of multiple valve gates or valves 11, 11a, 11b, 11c. In the example depicted in FIG. 1 four valves or valve gates 11, 11a, 11b, 11c are shown. More or less than four (4) valves can be employed in systems according to the invention. A single valve 11 can be employed, although multiple valves are typically employed and controlled.

Each valve 11, 11a, 11b, 11c is comprised of a downstream-most mounted nozzle 110. Each nozzle 110 of each valve 11, 11a, 11b, 11c routes the molten fluid 18 that is received from a single common source such as the barrel 19a, 19, or an inlet 19b that interconnects the barrel 19a to the manifold or from the common manifold channel 65 through a nozzle passage 115 to and ultimately through a gate 85 of the nozzle 110 of each valve 11, 11a, 11b, 11c to a single cavity 80 of a mold 70. As shown, each of the multiple valves 11, 11a, 11b, 11c could inject into the cavity 80 of a single mold 70 (typically in a cascade or sequential manner during the course of a single injection cycle). Or, one or more of the multiple valves could inject into the cavities of two or more separate molds 70, 72 during the course of a single injection cycle.

The system 10 preferably employs a one or more detectors or sensors 90 or 90a or 90b or 90c that senses or detect a single property (typically pressure or a condition that is indicative of pressure) of the injection fluid 18 that is located in a single discrete locus (such as in the barrel 19, 19a or inlet 19b or common channel 65) that is indicative of the flow rate of the injection fluid to and through each of the valves 11, 11a, 11b, 11c or their associated nozzle passages 115 or their associated gates 85. As shown, one locus and property that can be detected by a sensor such as detector 90b that is indicative of the fluid flow to or through each valve 11, 11a, 11b, 11c is position or speed of rotation of screw 16. Another discrete locus and property that can be sensed and input to the controller 200 is the injection fluid 18 and its pressure located in the barrel cavity 19a which can be sensed by detector 90 at the discrete locus 19a within the barrel 19 as shown in FIG. 1. Another discrete locus at which a property of the injection fluid 18 can be detected is a locus within a common fluid flow channel such as manifold flow channel 65 that feeds all of the multiple valves 11, 11a, 11b, 11c. Another discrete locus at which a property of the injection fluid 18 can be sensed is within the passage of an inlet 19b that connects the output of the barrel 19 to the input of the manifold 60.

As shown in FIG. 1, the pressure of the fluid 18 within barrel passage 19a or inlet 19b can be detected by sensor or detector 90 and a signal 95 indicative of the pressure is sent to controller 200. The pressure of fluid 18 within common manifold fluid flow channel 65 is sensed by sensor 90a and a signal 95a indicative of the pressure is sent to controller 200. The speed or position of screw 16 is sensed by sensor 90b and a signal 95b is sent to controller 200. The signal 95, 95a, 95b that is sent to controller 200 is typically a continuous real time signal indicative of the sensed property (pressure or speed or position or the like) that occurs continuously over a portion or the entirety of the upstream travel path of an injection cycle, preferably over at least the initial upstream travel portion of a valve pin 112 beginning from a gate closed position to a position intermediate fully closed and fully upstream or open.

The controller 200 receives a signal 95, 95a, 95b and includes instructions that use the signal 95, 95a, 95b as a control value that controls one or more valve pins 112 of one or more valves 11, 11a, 11b, 11c such that the one or more valve pins 112 are driven through an initial upstream path of travel beginning from the gate closed position through at least a portion of a complete upstream path of travel at one or more initial reduced upstream travel velocities that are less than a maximum upstream travel velocity.

Alternatively, the controller 200 can be loaded with a predetermined preferred profile of pressure, pin velocity or screw speed that provides a predetermined ideal rate of fluid flow through a gate over the course of an injection cycle that corresponds to a predetermined profile of injection fluid pressure, velocity or the screw position or screw speed over the course of an injection cycle. The controller 200 can be provided with instructions that calculate, in a closed loop control manner, a value in real time that is indicative of real time pressure, velocity or screw speed that is based on real time receipt of a signal 95, 95a, 95b. The controller 200 can then be provided with instructions that compare the calculated values based on the real time closed loop receipt of a signal 95, 95a, 95b to the predetermined profile and instantaneously instruct one or more actuators of one or more valves 11, 11a, 11b, 11c to adjust the position or movement of a corresponding valve pin 112 or adjust the speed of the screw 16 to attempt to match the real time calculated value of the injection fluid pressure, velocity or screw speed of the predetermined profile. A generic protocol for comparing and matching data contained in a predetermined profile is described for example in U.S. Pat. No. 6,464,909. Such a predetermined profile can be established by performance in advance of trial and error runs of injection cycles the results of which determine the pressure, velocity or screw speed profile over an injection cycle that produces the most preferred quality or kind of part in a mold cavity 80.

In another alternative control protocol, the predetermined profile of fluid pressure, velocity or screw speed can be established by user estimation or by instructions that automatically produce an improved profile based on manipulation of the data of a prior recorded profile according to a predetermined algorithm. For example, where a prior recorded profile of barrel pressure data from a first injection cycle exhibits sudden or severe dips in pressure over certain portions of the injection cycle, an improved profile can be generated by the controller 200 according to an algorithm that operates to reduce or eliminate the dips in pressure in the profile of the first injection cycle. The automatically adjusted and improved profile can then be used in a subsequent injection cycle. The controller 200 can thus execute the improved profile by controlling the positioning of the pin 112 in the subsequent injection cycle to attempt to follow the improved profile based on receipt by the controller 200 in real time of the signal 95 during the real time course of the subsequent injection cycle.

The variable or control value that is preferably used in an algorithm according to the invention, is generated by sensing a property of the system in a single discrete locus that is indicative of or common to the rate of fluid flow through all of multiple or plurality of nozzle passages 115 of all of multiple or plurality of valves 11, 11a, 11b, 11c in a flow system 10. Using a sensed property from a single discrete locus of the system, the algorithm can be programmed to control the valve pin withdrawal velocity and thus the rate of fluid flow through the nozzle passages 115 and gates 85 of all of the multiplicity of valves 11, 11a, 11b, 11c.

FIG. 1 illustrates the components of valve 11 in detail. For ease of explanation, each valve 11a, 11b, 11c is typically comprised of the same components as described with reference to valve 11, each valve being commonly fed by the injection fluid 18 flowing from barrel 19 and further flowing through downstream manifold channel 65. Manifold channel 65 is shown and referred to as one example of a common fluid flow channel. Any channel that commonly feeds all of the multiple valves 11, 11a, 11b, 11c could be employed for detecting a property of the injection fluid including a tube or pipe that interconnects the fluid output of the barrel 19 with the fluid input to flow channels disposed in the manifold 60.

As shown, the distal end of nozzle 110 has a gate 85 that is controllably openable and closeable by a valve pin 112 to stop and start the flow of material 18 through gate 85. Such controlled gate opening and closing is effected by controlled reciprocal upstream and downstream movement A of valve pin 112 that is controllably driven by a pneumatic actuator 30 that is in turn controllably driven most preferably by a fast acting linear force motor or valve 20. The downstream distal tip end of the valve pin 112 initially closes the gate 85 at the start of an injection cycle. When an injection cycle is initiated the valve pin 112 is withdrawn upstream opening the gate 85 and allowing the molten material 18 to flow through the gate 85 into the cavity 80 of the mold 70. Users of such equipment typically operate the system to cause the pin 112 to be withdrawn at a maximum upstream velocity causing the molten material 18 to flow at the highest pressure and rate of flow into the cavity 80 and often causing noticeably visible lines or blemishes on the final molded part that is formed within the cavity. Each separate valve 11, 11a, 11b, 11c can feed into a single cavity of a single mold or can each feed separately into separate cavities of separate molds (not shown for valves 11a, 11b, 11c).

In order to reduce or eliminate the visibility of the lines or blemishes in the final molded part, a fast acting motor 20 that drives a valve can be employed and can be controllably instructed by electronic signals 210, 210a, 210b, 210c generated by an algorithm contained in an electronic controller 200 to withdraw the pins 112 of one or more of valves 11, 11a, 11b, 11c at an upstream withdrawal velocity that is reduced relative to the maximum velocity of withdrawal.

Figure 2:
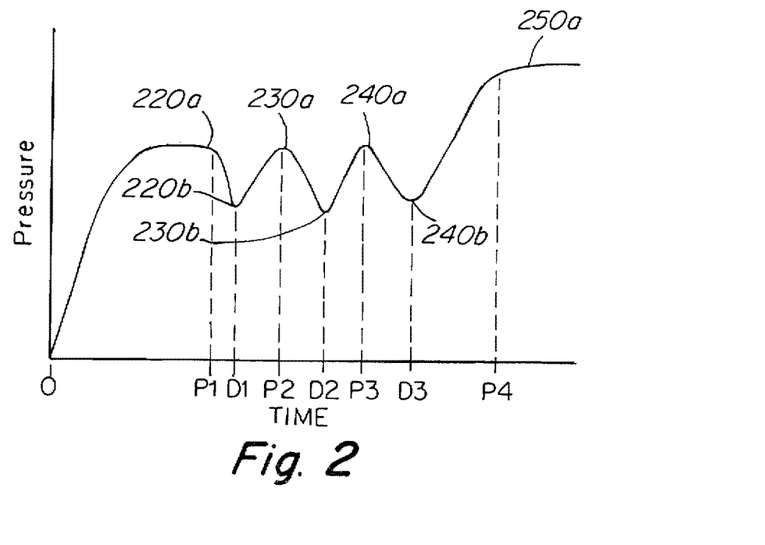
FIG. 2 is a generic plot of the pressure of the melt injection material within the barrel of the injection machine versus time showing sudden dips or reductions in melt material pressure when a valve pin is opened in a multivalve system such as in a cascade or sequentially opening gate system.
Figure 4:
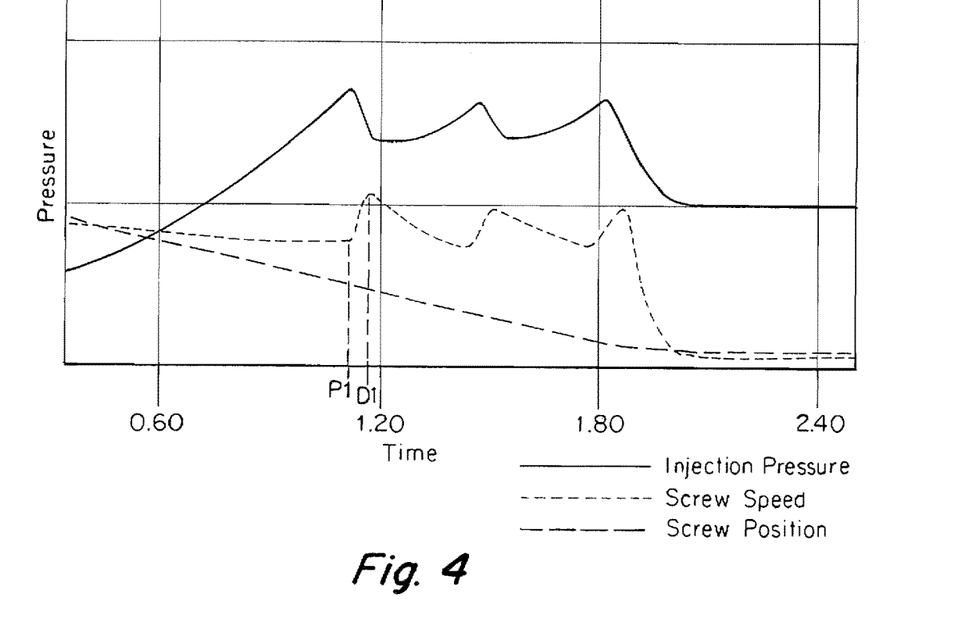
FIG. 4 is a simultaneous plot of the injection material pressure, injection machine screw speed and injection machine screw position of a typical cascade, multi-valved system without reducing or controlling the upstream opening velocity of the valve pins of the multiple valves also showing that the injection pressure of the injection material in the system dips or reduces suddenly at each gate when each valve pin of each valve is first opened and withdrawn from the gate closed position at maximum upstream velocity, the screw speed simultaneously spiking upward when each valve pin at each valve gate is initially opened at maximum withdrawal velocity.

FIGS. 2 and 4 shows a plot of the injection fluid pressure in the barrel 19a or inlet 19b versus time over the course of a first injection cycle where four valves, 11, 11a, 11b, 11c that are initially all closed are sequentially opened over the course of the first injection cycle. FIG. 4 shows a time analogous plot of the screw 16 speed and screw 16 position over the same course of time of the same first injection cycle.

With regard to the plots of FIGS. 2, 4, each of the valves 11, 11a, 11b, 11c start at a valve pin gate closed position and are withdrawn sequentially upstream to a travel position where the valve pin is in a fully upstream or maximum upstream position. As shown, at time zero of the injection cycle, the first valve 11 is initially opened (with all other valves 11a, 11b, 11c remaining closed) and the screw 16 is simultaneously started up to begin rotating and thus increasing the pressure in barrel 19a, inlet 19b from an initial zero up to an intermediate local maximum or high peak pressure 220a.

In the first injection cycle as shown in FIGS. 2, 4, at about time P1 the second valve pin associated with the second valve 11a is initially withdrawn from its associated gate at maximum upstream velocity causing the pressure 220a in the barrel 19a to suddenly drop down until the pressure in the barrel 19a reaches a low peak of 220b at time D1. As shown in FIG. 4, between time P1 and D1 the screw speed increases because of the drop in fluid pressure and the constant amount of power driving the screw 16. Between time P1 and D1 the screw speed continues to increase until eventually at about time D1 the speed of the screw 16 has caught up with the dip in pressure to cause the pressure in barrel 19a and inlet 19b to begin to rise again. With the first and second valves 11, 11a now open at time D1 and third and fourth valves 11b, 11c still closed, the pressure continues to increase as the screw continues to inject injection fluid into the system until the pressure reaches a second high peak pressure 230a at time P2 when the pin associated with the third valve 11b is opened from its associated gate and withdrawn at maximum velocity thus causing the pressure to again drop down to a low peak pressure 230b at time D2. Similarly, between time P2 and D2 the screw speed continues to increase until eventually at about time D2 the speed of the screw 16 has caught up with the dip in pressure to cause the pressure in barrel 19a and inlet 19b to begin to rise again. Now with the first and second and third valves 11, 11a, 11b open and valve 11c still closed, the pressure continues to increase beginning at time D2 as the screw continues to inject injection fluid into the system until the pressure reaches a third high peak pressure 240a at time P3 at which time the pin associated with the fourth valve 11c is withdrawn at maximum upstream velocity from its associated gate closed position thus causing the pressure to again drop down to a low peak pressure 240b at time D3. At time D3 with all four valves now open and the screw under constant power drive force, the pressure continues to rise from low peak 240b up to a final constant or steady pressure 250a.

During the first injection cycle, as shown in FIG. 4, between each of the high peak pressure times P1, P2, P3 and low peak pressure times D1, D2, D3, the screw speed increases because of the fluid pressure drops the screw 16 is driven under a constant amount of power without algorithmic control of the screw speed.

In one aspect of the invention, the system 10 can achieve a relatively constant fluid pressure in the barrel 19, 19a (or the manifold channel 65) over the course of an entire subsequent second or third or other injection cycle that follows a prior injection cycle such as the first injection cycle where pressure dips as described above have occurred on account of high velocity withdrawal of the valve pins from the gate closed positions.

Figure 3:
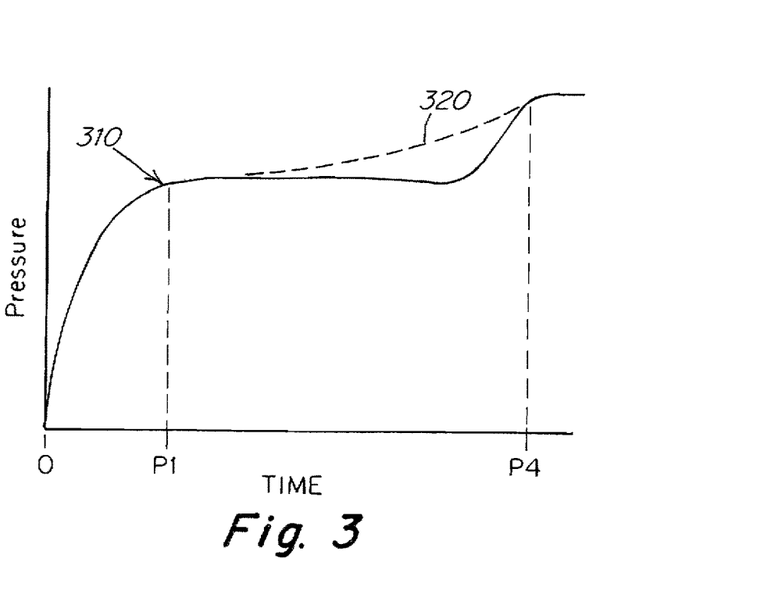
FIG. 3 is a generic plot of pressure of the melt injection material within the barrel of the injection machine versus time showing a substantially constant melt pressure when the velocity of upstream withdrawal of the valve pins for each valve is controllably reduced in response to a feedback pressure signal from the pressure sensor shown in FIG. 1 to the controller shown in FIG. 1 that contains an algorithm that controls the drive and velocity of the valve pins of the system based on the pressure signal received.

FIG. 3 shows a plot of barrel fluid pressure versus time that occurs on a second or third or other subsequent injection cycle that follows the first injection cycle plotted in FIGS. 2, 4 using the controller 200 to control upstream pin withdrawal velocity. As shown in FIG. 3, the sudden dips in injection fluid pressure that occurred on the first injection cycle of FIGS. 2, 4, (beginning at times P1, P2, P3) can be corrected for, starting with at least a second subsequent injection cycle, FIG. 3, by reducing the initial upstream withdrawal velocity of one or more of the valve pins 112 associated with one or more of the valves 11, 11a, 11b, 11c by a preselected reduction in initial upstream withdrawal velocity of the valve pins 112 that can be programmed into the instructions or by a real time calculated amount of reduction in upstream withdrawal velocity using a real time closed loop signal 95, 95a, 95b or 95c as a variable in an algorithm executed by controller 200 that calculates and executes pin withdrawal velocity in real time during the course of an injection cycle.

As shown in FIG. 3, beginning at time P1 when the barrel pressure has reached a peak and the second valve 11a is initially opened, the sensor 90 sends a pressure signal 95 (or sensors 90a, 90b send signals 95a, 95b) to controller 200 that has a program with instructions that use the received pressure signal as a value in an algorithm that determines a reduced valve pin withdrawal speed for each of the valves 11a, 11b and 11c at the predetermined sequential valve opening times P1, P2, P3 respectively. The calculated reduced valve pin withdrawal speeds are sent by controller 200 to one or more of the drive valves 20. The calculated reduced valve pin withdrawal speeds are used by controller 200 to control the speed of upstream movement of the corresponding actuators 30 associated with each valve pin 112 associated with each of valves 11a, 11b, 11c. The pressure signal 95, 95a or screw position or speed signal 95b is preferably sent continuously during the second or other subsequent injection cycle to the controller 200 and most preferably continuously at least over that portion of the cycle where the valve pin 112 travels from the gate closed position to positions upstream of the gate where the distal tip ends 112d of the valve pins 112 are positioned relative to the interior surface 85s of the gates 85 such that the distal ends 112d operate to slow or reduce the rate of flow injection fluid through the gates 85 by restricting the size of the fluid flow passage between the distal ends 112d and the internal surfaces 85s of the gates as described in PCT/US13/75064 filed Dec. 13, 2013 and international application PCT/US14/192210 filed Feb. 28, 2014 and international application PCT/US14/31000 filed Mar. 18, 2014, the disclosures of which are incorporated herein by reference in their entirety as if fully set forth herein.

In embodiments where the controller 200 controls all of the multiple valve gates 11, 11a, 11b, 11c during an injection cycle, the controller 200 includes a pin sequence instruction that can instruct and execute the opening and upstream pin withdrawal velocity of each separate valve 11, 11a, 11b, 11c in any preselected timed sequence.

As shown in FIG. 3 the ideal end result of the controller's instructions using a real time signal 95, 95a, 95b, 95c to adjust the upstream valve pin withdrawal velocity is to flatten the pressure plot out such that there are fewer or less pronounced dips in pressure of the injection fluid in the barrel 19, 19a or in the manifold channel 65 upon opening of one or more of the valves 11, 11a, 11b, 11c during an injection cycle. Ideally, the pressure rises to a peak at time P1 and remains substantially steady or constant 310 or close to steady 320 (smoothly rising relatively little) over the course of time between when the second valve gate 11a is opened P1 and the time D3 shortly after the last valve gate 11c has been opened.

Figure 5:
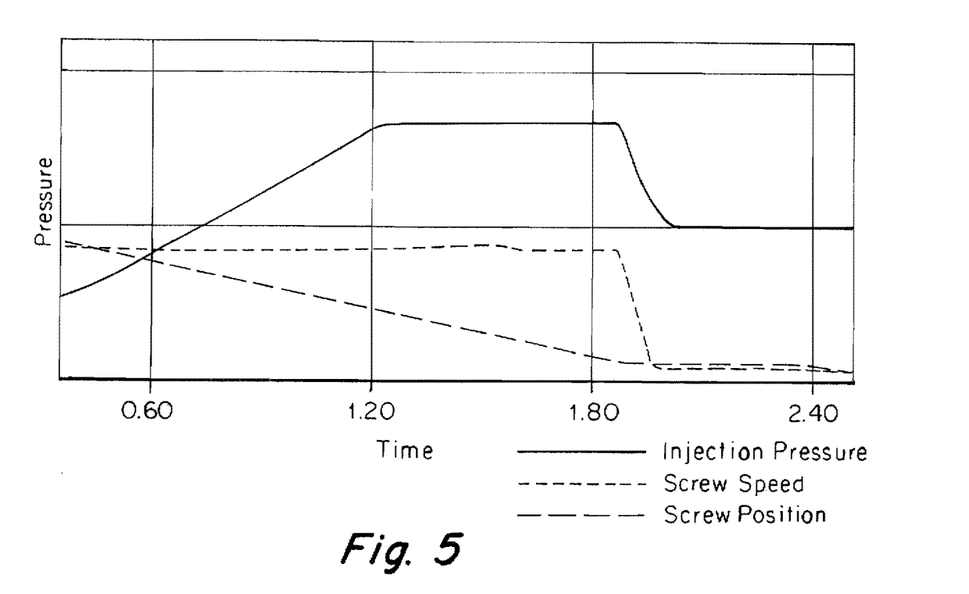
FIG. 5 is an alternative simultaneous plot similar to FIG. 4 showing pressure, speed and position when the actuators to each valve are controlled by a controller to cause the valve pins to be withdrawn at a reduced velocity when initially opened, the plots showing that when the initial pin withdrawal velocity is so reduced the injection pressure in the system or at least at the gate areas of each valve remains substantially steady or constant at least over the course of the period of the initial withdrawal of the pins from the closed gate position upstream to a fully gate open position. As shown both the injection material pressure and the screw speed stay substantially steady or constant under such controlled reduced velocity pin withdrawal protocols.

FIG. 5 shows another alternative plot of barrel pressure versus time with corresponding screw speed and screw position versus time for an injection cycle where the controller 200 controls the upstream withdrawal velocities of the one or more valve pins using a real time signal 95, 95a, 95b or 95c in an appropriate algorithm as described above.

The instructions included in the program preferably use the continuously received signal 95, 95a, 95b to calculate in real time during the course of an injection cycle the withdrawal speed of the valve pins or actuators associated with one or more of the valves 11, 11a, 11b, 11c so as to substantially reduce or eliminate the dips in pressure that occur between times P1 and D1 or P2 and D2 or P3 and D3 as described with reference to a first or previous injection cycle. In a typical embodiment, the algorithm of the controller will calculate and execute a first partially reduced or modified withdrawal velocity for one or more of the valves on a second subsequent injection cycle and continue on a third or fourth or other subsequent injection cycle to calculate and execute further reduced or modified pin withdrawal velocities based on the degree of dips in barrel (or inlet or channel) pressure that may be detected at the predetermined valve opening times P1, P2, P3. Thus a system 10 according to the invention can be programmed to "self-adapt" on each subsequent injection cycle to reduce or eliminate dips in barrel pressure (or screw speed) in any one or more injection cycles where a dip in pressure or screw speed is detected by a sensor 90, 90a, 90b.

In alternative embodiments, the pressure of the material 18a can be measured by a sensor 90a mounted and arranged to sense injection fluid material flowing within a channel 65 disposed within the manifold 60 that commonly feeds all nozzles 115. The pressure of the fluid material can alternatively be measured and sensed by a sensor 90c mounted and arranged to sense the material disposed within the cavity 80. In each embodiment, the sensors 90, 90a, 90c send a signal representative of the sensed pressure to the controller 200 for use in the algorithm that controls the drive of the actuators to reduce the withdrawal velocity of one or more pins 112.

The actuators typically comprise a pneumatic or hydraulic actuator or an electric actuator, the controller 200 being adapted to control the drive mechanism for each such kind of actuator. In the case of a pneumatically or hydraulically driven actuator, the drive mechanism is an electrically drivable mechanism interconnected to a fluid flow control valve similar to valve 20. In the case of an electric actuator the drive mechanism is typically an electric motor that is controllably drivable by an electronic controller 200.

Thus algorithm in the controller 200 knows when and for how long to reduce the upstream withdrawal velocity based on the pressure or screw speed signal received from a sensor as a drop or increase in pressure of the material 18 or an increase in screw speed corresponds to an increase in material flow rate at the gate 85 area.

In order to minimize, reduce or eliminate artifacts or blemishes in the final molded part in the cavity 80, the pressure of the injection material 18, 18a is preferably maintained at a substantially constant or steady pressure particularly when the valve pins 112 are initially opened at the start of a cycle.

What is claimed is:

1. An injection molding system comprised of:
    an injection machine having a barrel and a screw for injecting an injection fluid to one or more downstream gates of one or more cavities of one or more molds during a first injection cycle and during a second injection cycle following the first injection cycle,
    a distribution manifold for receiving the injection fluid from the barrel and distributing the injection fluid through one or more fluid delivery channels in the manifold that deliver the injection fluid to one or more downstream fluid passages that mate with corresponding ones of the one or more downstream gates to the one or more mold cavities,
    a valve associated with each downstream gate, each valve comprising an actuator interconnected to and reciprocally driving a corresponding valve pin at one or more selectable upstream travel velocities that include a maximum upstream travel velocity, the valve pins being driven between a gate closed position and a selected maximum upstream gate open position defining a complete upstream path of travel for each injection cycle,
    a sensor adapted to sense pressure of the injection fluid in the barrel or in an inlet that delivers the injection fluid from the barrel to the manifold, the sensor sending a signal to a controller that is indicative of the sensed pressure in the barrel or the inlet,
    the controller receiving the signal and including instructions that use the signal as a control value to controllably drive one or more valve pins, during the second injection cycle, through an initial upstream path of travel beginning from the closed position through at least a portion of the complete upstream path of travel at one or more initial reduced upstream travel velocities during the second injection cycle that are less than the maximum upstream travel velocity,
    the instructions further using the control value as a variable in an algorithm that establishes an instruction value for the one or more initial reduced upstream travel velocities that operates to drive the one or more valve pins to effect a rate of flow of the injection fluid through each gate corresponding to the one or more valve pins during the second injection cycle that is either reduced or is substantially constant relative to a rate of flow of the injection fluid during the first injection cycle over at least the initial upstream path of travel of the one or more valve pins.

2. The system of claim 1 wherein the controller further uses the signal sent by the sensor, as a control value that controls each actuator to drive a corresponding valve pin during a third injection or other subsequent injection cycle following the second injection cycle, through an initial upstream path of travel beginning from the closed position through at least a portion of the complete upstream path of travel at the one or more initial reduced upstream travel velocities during the third or other subsequent injection cycle that are less than the maximum upstream travel velocity, the instructions using the control value as a variable in an algorithm that establishes an instruction value for the one or more initial reduced upstream travel velocities that operates to drive the one or more valve pins to effect a rate of flow of the injection fluid through each gate corresponding to the one or more valve pins during the third or other subsequent injection cycle that is either reduced or is substantially constant relative to the rate of flow of the injection fluid during the second injection cycle over at least the initial upstream path of travel of the one or more valve pins.

3. The system of claim 1 wherein the sensor is adapted to sense one or more conditions selected from the group of:

pressure of the injection fluid in the barrel or in the inlet, speed or position of the screw, pressure of the injection fluid in the one or more fluid delivery channels in the manifold, pressure of the injection fluid in a cavity of one or more of the molds, wherein the sensor sends a signal indicative of the one or more sensed conditions to the controller, and, the controller receives and uses the signal as the control value.

4. The system of claim 1 wherein the instructions instruct the actuator to drive the pin continuously upstream throughout the complete upstream path of travel.

5. The system of claim 1 wherein the controller receives and the instructions use the control value in real time in a closed loop over the course of travel of the one or more valve pins over at least a portion of the complete upstream path of travel, the instructions directing the one or more valve pins to either follow a predetermined profile of pressure or pin position or velocity or to calculate a pin position or velocity and drive the pin at or to the calculated pin position or velocity in real time based on the control value.

6. A method of injecting an injection fluid into one or more cavities of one or more molds comprising:

operating an injection molding system according to claim 1 to inject the injection fluid into the one or more cavities, and forming a part from the injection fluid injected into the one or more cavities.

7. An injection molding system comprised of:

an injection machine having a barrel and a screw for injecting an injection fluid, a distribution manifold for receiving the injection fluid from the barrel and distributing the injection fluid through one or more fluid delivery channels in the manifold that deliver the injection fluid to one or more downstream fluid passages that mate with corresponding one or more downstream gates to corresponding one or more mold cavities, a valve associated with a corresponding one of the one or more downstream gates, each valve comprising an actuator interconnected to and reciprocally driving a corresponding valve pin at one or more selectable upstream travel velocities including a maximum upstream travel velocity, the valve pin being driven between a gate closed position and a selected maximum upstream gate open position defining a complete upstream path of travel, a sensor adapted to sense and generate a signal indicative of pressure of the injection fluid in the barrel or an inlet that delivers the injection fluid from the barrel to the manifold, a controller receiving the signal generated by the sensor and that includes instructions that use the signal indicative of the pressure of the injection fluid in the barrel or an inlet that delivers the injection fluid from the barrel to the manifold as a control value to automatically adjust, during the course of an injection cycle, positioning or velocity of one or more of the valve pins such that a rate of flow of the injection fluid into a corresponding one or more of the cavities is controlled, during the course of the injection cycle, based on the control value.

8. The system of claim 7 wherein the instructions use the signal as a control value to drive one or more of the valve pins through an initial upstream path of travel beginning from the closed position through at least a portion of the complete upstream path of travel at one or more initial reduced upstream travel velocities that are less than the maximum upstream travel velocity.

9. The system of claim 7 wherein the system is operable to carry out a first injection cycle and a second injection cycle following the first injection cycle, the instructions using the signal as a control value that controls one or more valve pins to be driven, during the second injection cycle, through an initial upstream path of travel beginning from the closed position through at least a portion of the complete upstream path of travel at one or more initial reduced upstream travel velocities during the second injection cycle that are less than the maximum upstream travel velocity, the instructions further using the control value as a variable in an algorithm that establishes an instruction value for the one or more initial reduced upstream velocities that operates to drive the one or more valve pins to effect a rate of flow of the injection fluid through each gate corresponding to the one or more valve pins during the second injection cycle that is either reduced or is substantially constant relative to the rate of flow of the injection fluid during the first injection cycle over at least the initial upstream path of travel of the one or more valve pins.

10. The system of claim 7 wherein the instructions instruct the actuator to drive the pin continuously upstream throughout the complete upstream path of travel.

11. The system of claim 7 wherein the controller receives and the instructions use the control value in real time in a closed loop over the course of travel of the one or more valve pins over at least a portion of the complete upstream path of travel, the instructions directing the one or more valve pins to either follow a predetermined profile of pressure or pin position or velocity or to calculate a pin position or velocity and drive the pin at or to the calculated pin position or velocity in real time based on the control value.

12. A method of injecting an injection fluid into one or more cavities of one or more molds, comprising:

operating an injection molding system according to claim 7 to inject the injection fluid into the one or more cavities, and forming a part from the injection fluid injected into the one or more cavities.

13. A method of performing injection cycles in an injection molding system comprised of:
   an injection machine having a barrel and a screw for injecting an injection fluid,
   a distribution manifold for receiving the injection fluid from the barrel and distributing the injection fluid through one or more fluid delivery channels in the manifold that deliver the injection fluid to one or more downstream fluid passages that mate with corresponding downstream gates to one or more mold cavities,
   a valve associated with each downstream gate, each valve comprising an actuator interconnected to and reciprocally driving a corresponding valve pin at one or more selectable upstream travel velocities including a maximum upstream travel velocity, the pin being driven between a gate closed position and a selected maximum upstream gate open position defining a complete upstream path of travel,
   the method comprising:
   automatically sending to a controller a signal from a sensor adapted to sense and generate a signal indicative of a condition selected from the group of:
   pressure of the injection fluid in the barrel or in an inlet that delivers the injection fluid from the barrel to the manifold,
   speed or position of the screw,
   programming the controller to include instructions that use the signal indicative of the selected condition as a control value to controllably drive one or more valve pins through an initial upstream path of travel during an injection cycle beginning from the closed position through at least a portion of the complete upstream path of travel at one or more initial reduced upstream travel velocities that are less than the maximum upstream travel velocity,
   further programming the controller to include instructions that further use the control value as a variable in an algorithm that establishes an instruction value for the one or more initial reduced upstream travel velocities that operates to drive the one or more valve pins to effect a rate of flow of the injection fluid through each gate corresponding to the one or more valve pins during the injection cycle that is reduced relative to a maximum rate of flow of the injection fluid over at least the initial upstream path of travel of the one or more valve pins.

14. The method of claim 13 wherein the instructions instruct the actuator to drive the valve pin at the one or more reduced upstream travel velocities that are less than the maximum upstream travel velocity that maintain pressure of the injection fluid travelling through the gate at a substantially constant pressure throughout the course of the complete upstream path of travel.

15. The method of claim 13 wherein the system is operable to carry out a first injection cycle and a second injection cycle following the first injection cycle, the instructions using the signal as a control value that controls one or more valve pins to be driven, during the second injection cycle, through the initial upstream path of travel beginning from the closed position through at least a portion of the complete upstream path of travel at the one or more initial reduced upstream travel velocities during the second injection cycle that are less than the maximum upstream travel velocity,
   the instructions using the control value as a variable in an algorithm that establishes an instruction value for the one or more initial reduced upstream travel velocities that operates to drive the one or more valve pins to effect a rate of flow of the injection fluid through each gate corresponding to the one or more valve pins during the second injection cycle that is either reduced or is substantially constant relative to the rate of flow of the injection fluid during the first injection cycle over at least the initial upstream path of travel of the one or more valve pins.

16. The method of claim 13 wherein the instructions instruct the actuator to drive the pin continuously upstream throughout the complete upstream path of travel.

17. The method of claim 13 wherein the controller receives and the instructions use the control value in real time in a closed loop over the course of travel of the one or more valve pins over at least a portion of the complete upstream path of travel, the instructions directing the one or more valve pins to either follow a predetermined profile of pressure or pin position or velocity or to calculate a pin position or velocity and drive the pin at or to the calculated pin position or velocity in real time based on the control value.

18. A method of injecting an injection fluid into one or more cavities of one or more molds, comprising:
   operating an injection molding system according to claim 13 to inject the injection fluid into the one or more cavities, and
   forming a part from the injection fluid injected into the one or more cavities.

* * * * *